UNITED STATES PATENT OFFICE.

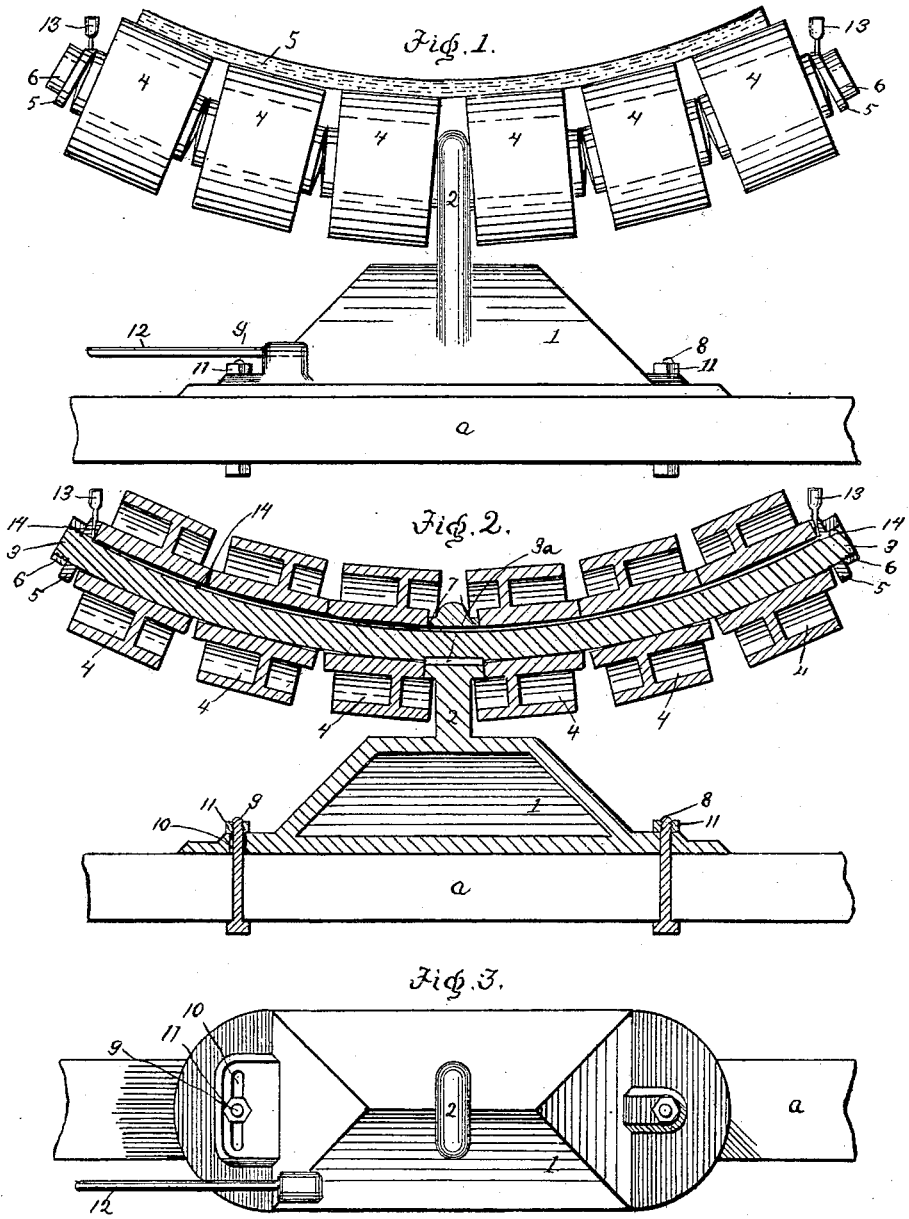

MARTIN LYNCH, OF STONECO, NEW YORK.

ROLLER-SUPPORT FOR BELT CONVEYERS.

SPECIFICATION forming part of Letters Patent No. 625,342, dated May 23, 1899.

Application filed December 19, 1898. Serial No. 699,763. (No model.)

*To all whom it may concern:*

Be it known that I, MARTIN LYNCH, a citizen of the United States, residing at Stoneco, Dutchess county, and State of New York, have invented certain new and useful Improvements in Roller-Supports for Belt Conveyers, of which the following is a full, clear, and exact specification.

The invention relates to the support and rollers for the belt.

One object of the invention is to provide a simple, compact, and durable support for the rollers on which the belt runs; secondly, to provide a curved shaft, keyed or otherwise securely fixed into the top of the support, which will curve the belt into a trough, so as to better hold the substance to be conveyed, and, finally, to provide the support with one end pivoted to the usual framework and the other end slightly movable, so as to enable proper adjustment to keep the belt running straight.

With these objects in view the invention consists in certain features of construction and combination of parts, which will hereinafter be fully described and claimed.

In the drawings, Figure 1 is a side elevation of my improved roller-support, showing the relation of parts when in use. Fig. 2 is a section of the same. Fig. 3 is a plan view with shaft and rollers removed, showing the adjustment device.

Referring to the accompanying drawings, 1 denotes the base or standard, designed to be fastened in the manner hereinafter more fully described, to the usual wooden framework $a$ and provided with the upright post 2, pierced near the top by the shaft 3, which is securely fastened by the key $3^a$ or other well-known means to prevent its moving.

The rollers or pulleys 4 are constructed with the ends of their hubs on a slight bevel from the center to the edge, so as to run smoothly on the curved shaft, and are kept in place on said shaft by the washers 5 and nuts 6, or may be secured by any well-known means.

It will readily be seen that by this device the belt $b$ is given the right curve and will run very smoothly and that by using a shorter shaft and fewer rollers the support may be used for a narrower belt than shown in the drawings.

The inside hubs of the middle set of rollers are designed to roll against the shoulders 7 and the sides of the post 2, as shown in Fig. 2.

Referring to Fig. 3 of the drawings, I will now describe the shifting device for the proper adjustment of the belt. The base 1 is bolted at one end to the wooden beam or framework by the bolt 8. At the other end the bolt 9 is designed to slide in the slot 10 by loosening the nut 11 and moving the base 1 in the desired direction, using the rod 12 as a lever on 8 as a center. In this manner the belt $b$ may be adjusted so as to run perfectly straight and smooth.

The manner of oiling will be seen from the drawings, and consists of allowing the oil to run from the cups 13 down the groove 14 on the upper side of the shaft 3, in which manner it will deliver oil to each roller.

Having fully described my invention, what I claim, and desire to secure by Letters Patent, is—

1. The combination of an adjustable base, secured in the manner described to the usual framework, a post or upright forming part of the same, an upwardly-curved shaft securely fastened to the upper end of the post, and rollers or pulleys, having the ends of their hubs beveled, mounted on said shaft, substantially as and for the purposes set forth.

2. In a roller-support, the combination of the base secured in the manner described, the upright post forming part of the same, the upwardly-curved shaft having an oil-groove and held in place on the said post by the key, and the rollers having bevel-ended hubs mounted on said shaft, substantially as and for the purposes set forth.

MARTIN LYNCH.

Witnesses:
M. A. CLAPP,
GEO. SAGUE.